United States Patent
Kim et al.

(10) Patent No.: US 10,691,095 B2
(45) Date of Patent: Jun. 23, 2020

(54) IN-SITU DIAGNOSTICS AND CONTROL METHOD AND SYSTEM FOR MATERIAL EXTRUSION 3D PRINTING

(71) Applicant: Board of Regents, The University of Texas System, Austin, TX (US)

(72) Inventors: Chi Yen Kim, El Paso, TX (US); David Espalin, El Paso, TX (US); Eric MacDonald, El Paso, TX (US); Ryan Wicker, El Paso, TX (US)

(73) Assignee: Board of Regents, The University of Texas System, Austin, TX (US)

( * ) Notice: Subject to any disclaimer, the term of this patent is extended or adjusted under 35 U.S.C. 154(b) by 538 days.

(21) Appl. No.: 15/497,278

(22) Filed: Apr. 26, 2017

(65) Prior Publication Data

US 2017/0315526 A1  Nov. 2, 2017

Related U.S. Application Data

(60) Provisional application No. 62/330,361, filed on May 2, 2016.

(51) Int. Cl.
| | |
|---|---|
| *G05B 19/048* | (2006.01) |
| *B33Y 50/02* | (2015.01) |
| *B29C 64/386* | (2017.01) |
| *B29C 64/118* | (2017.01) |
| *B29C 64/209* | (2017.01) |

(Continued)

(52) U.S. Cl.
CPC .......... *G05B 19/048* (2013.01); *B29C 64/118* (2017.08); *B29C 64/209* (2017.08); *B29C 64/321* (2017.08); *B29C 64/386* (2017.08); *B33Y 50/02* (2014.12); *G05B 19/0428* (2013.01); *G05B 2219/49023* (2013.01)

(58) Field of Classification Search
CPC .............. G05B 19/048; G05B 19/0428; G05B 2219/49023; B33Y 50/02; B29C 64/321; B29C 64/118; B29C 64/386; B29C 64/209
USPC ........................................................ 700/119
See application file for complete search history.

(56) References Cited

U.S. PATENT DOCUMENTS

| | | | |
|---|---|---|---|
| 6,923,634 B2 * | 8/2005 | Swanson ................. | B29C 64/40 425/169 |
| 6,995,334 B1 | 2/2006 | Kovacevic et al. | |

(Continued)

FOREIGN PATENT DOCUMENTS

| | | |
|---|---|---|
| CN | 103706791 B | 6/2015 |
| CN | 103921446 B | 4/2016 |
| EP | 2259912 B1 | 2/2012 |

OTHER PUBLICATIONS

Chiyen Kim, A Study to Detect a Material Deposition Statue in Fused Deposition Modeling Technology, Jul. 11, 2015, IEEE Conference on Advanced Intelligent Mechatronics (Year: 2015).*

(Continued)

*Primary Examiner* — James J Lee
*Assistant Examiner* — Christopher W Carter
(74) *Attorney, Agent, or Firm* — Yee & Associates, P.C.

(57) ABSTRACT

Methods and systems for diagnosing and controlling material deposition during a material extrusion 3D printing process. A current sensor can measure a current signal consumed by a material feed motor. The current signal can be analyzed in the time domain and frequency domain to detect material deposition characteristics and prescribe process parameter changes.

20 Claims, 6 Drawing Sheets

(51) Int. Cl.
*B29C 64/321* (2017.01)
*G05B 19/042* (2006.01)

(56) References Cited

U.S. PATENT DOCUMENTS

| | | | |
|---|---|---|---|
| 7,045,738 | B1 | 5/2006 | Kovacevic et al. |
| 7,099,852 | B2 * | 8/2006 | Unsworth ........... F04D 15/0077 706/23 |
| 7,291,002 | B2 | 11/2007 | Russell et al. |
| 7,556,490 | B2 | 7/2009 | Wicker et al. |
| 7,828,022 | B2 | 11/2010 | Davidson et al. |
| 7,971,991 | B2 | 7/2011 | Davidson et al. |
| 8,598,523 | B2 | 12/2013 | Stecker et al. |
| 8,760,713 | B2 | 6/2014 | Zhan |
| 8,809,780 | B2 | 8/2014 | Wollenhaupt et al. |
| 8,828,311 | B2 | 9/2014 | Medina et al. |
| 9,085,109 | B2 | 7/2015 | Schmehl et al. |
| 9,168,698 | B2 | 10/2015 | Kemperle et al. |
| 9,414,501 | B2 | 8/2016 | Wicker et al. |
| 9,469,057 | B2 | 10/2016 | Johnson et al. |
| 9,469,072 | B2 | 10/2016 | Schmehl et al. |
| 9,527,245 | B2 | 12/2016 | Starodubtsev |
| 9,573,193 | B2 | 2/2017 | Buller et al. |
| 2004/0060639 | A1 | 4/2004 | White |
| 2009/0206522 | A1 | 8/2009 | Hein et al. |
| 2014/0014629 | A1 | 1/2014 | Stecker |
| 2014/0085620 | A1 | 3/2014 | Lobovsky et al. |
| 2015/0042755 | A1 | 2/2015 | Wang |
| 2015/0061170 | A1 | 3/2015 | Engel et al. |
| 2015/0064050 | A1 | 3/2015 | Retze et al. |
| 2015/0140147 | A1 | 5/2015 | Konstantinos et al. |
| 2015/0142152 | A1 | 5/2015 | Rezayat |
| 2015/0027239 | A1 | 6/2015 | Konkle |
| 2015/0261196 | A1 | 9/2015 | Wilson et al. |
| 2015/0266235 | A1 | 9/2015 | Page |
| 2015/0283763 | A1 | 10/2015 | Chi et al. |
| 2015/0352639 | A1 | 12/2015 | Toyserkani et al. |
| 2015/0352794 | A1 | 12/2015 | Nguyen et al. |
| 2016/0015311 | A1 | 1/2016 | Jiang |
| 2016/0016254 | A1 | 1/2016 | Stecker et al. |
| 2016/0046073 | A1 | 2/2016 | Nadas |
| 2016/0046076 | A1 | 2/2016 | Huang et al. |
| 2016/0052086 | A1 | 2/2016 | Mazumder et al. |
| 2016/0321384 | A1 | 11/2016 | Pal et al. |

OTHER PUBLICATIONS

Gupta, O. P., 3D Printing—Manufacturing Technology of Present and Future, Seminar on Engineer's Day, Institution of Engineers (India), Bareilly Local Center, Bareilly, India, Sep. 2015, 7 pages.
Koff, W. et al., 3D Printing and the Future of Manufacturing, CSC, Fall 2012, Leading Edge Forum Technology Program, 32 pages, https://assets1.csc.com/innovation/downloads/LEF_20123DPrinting.pdf.
Shemelya, C. et al., Multi-functional 3D Printed and Embedded Sensors for Satellite Qualification Structures, 2015 IEEE Sensors, Nov. 1-4, Busan, South Korea, 4 pages.
Paudyal, M., A Brief Study on Three-Dimensional Printing Focusing on the Process of Fused Deposition Modeling, Degree Thesis, Plastics Technology, Helsinki, 2015, 56 pages.
Macdonald, E. et al., 3D Printing for the Rapid Prototyping of Structural Electronics, Digital Object Identifier (2014) 2:234-242.
Deffenbaugh, P. I., 3D Printed Electromagnetic Transmission and Electronic Structures Fabricated on a Single Platform using Advanced Process Integration Techniques, Dissertation, University of Texas at El Paso, Doctor of Philosophy, Aug. 2014, 227 pages.
Wust, S. et al., Controlled Positioning of Cells in Biomaterials—Approaches Towards 3D Tissue Printing, J. FUnct. Biomater. (2011)2:119-154.
W.M. Keck Center for 3D Innovation, Driving the Additive Manufacturing Revolution, 2014-2015, University of Texas at El Paso, 7 pages.
Lewis, J. A., Printing Functional Materials, University of Illinois, 2012, 36 pages.
Faber, M., Material Development, for Fused Deposition Modeling, Jan. 21, 2016, 3D Printing Materials Conference, 30 pages.
Stratasys Direct Manufacturing, 3D Printing Materials: Choosing the Right Material for your Application, stratasysdirect.com, 20 pages.

* cited by examiner

IN-SITU DIAGNOSTICS AND CONTROL METHOD AND SYSTEM FOR MATERIAL EXTRUSION 3D PRINTING

CROSS-REFERENCE TO PROVISIONAL APPLICATION

This nonprovisional patent application claims the benefit under 35 U.S.C. § 119(e) and priority to U.S. Provisional Patent Application Ser. No. 62/330,361, filed on May 2, 2016, entitled "In-Situ Diagnostics and Control Method and System for Material Extrusion 3D Printing," which is hereby incorporated herein by reference in its entirety.

TECHNICAL FIELD

Embodiments are related to the field of additive manufacturing including 3D (Three-Dimensional) printing. Embodiments are also related to closed-loop control systems and monitoring tools.

BACKGROUND 3D printing is an additive manufacturing process for making three-dimensional objects of arbitrary shapes from digital models. Other terms used synonymously to refer to 3D printing include additive manufacturing, layer manufacturing, rapid prototyping, layer-wise fabrication, solid freeform fabrication, and direct digital manufacturing. One such technology is material extrusion 3D printing, which is also known as fused filament fabrication or FDM™ (Fused Deposition Modeling). FDM™ is a trademark used by Stratasys, Inc. A similar or equivalent technology is FFF (Fused Filament Fabrication), which is also sometimes referred to as PJP (Plastic Jet Printing).

This technology works by driving a filament into a heated block wherein the solid filament is softened to promote material flow. The flowable material can then be further driven through a small diameter nozzle and accurately deposited on a substrate material or previously deposited material. The deposited material is referred to as a raster. Note that large extruders are also currently being implemented in combination with robotic systems.

Currently, these technologies do not include closed-loop control and have limited monitoring tools. The implementation of the disclosed diagnostic and control method can enable the material extrusion 3D printing process to detect manufacturing flaws and correct them during fabrication.

BRIEF SUMMARY

The following summary is provided to facilitate an understanding of some of the innovative features unique to the disclosed embodiments and is not intended to be a full description. A full appreciation of the various aspects of the embodiments disclosed herein can be gained by taking the entire specification, claims, drawings, and abstract as a whole.

It is, therefore, one aspect of the disclosed embodiments to provide for improved additive manufacturing processes, including improved 3D printing.

It is another aspect of the disclosed embodiments to provide a closed-loop control system and monitoring tools.

It is yet another aspect of the disclosed embodiments to provide in-situ diagnostics and a control method and system for material extrusion 3D printing.

It is still another aspect of the disclosed embodiments to provide for methods and systems for use with low volume extruders and/or large volume extruders.

The aforementioned aspects and other objectives and advantages can now be achieved as described herein. Methods and systems are disclosed for diagnosing and controlling material deposition during a material extrusion 3D printing process. A current sensor can measure a current signal consumed by a material feed motor. The current signal can be analyzed in the time domain and the frequency domain in order to detect material deposition characteristics and prescribe process parameter changes.

A number of example embodiments are disclosed herein. For example, in one embodiment, a method for diagnosing and controlling material deposition during a material extrusion 3D printing process can be implemented. Such a method can include steps, instructions, or operations such as measuring with a current sensor a current signal consumed by a material feed motor, wherein the current signal is analyzed in the frequency domain and the time domain to detect material deposition characteristics and prescribe process parameter changes. In some example embodiments, other steps, instructions, or operations can be implemented, such as, for example, treating the extrusion setup as a second order loaded DC motor system to determine the reaction force that develops within the extrusion nozzle that is caused by the extrudate's interaction with its surroundings.

In other example embodiments, a step, instruction, or operation can be implemented for analyzing the current signal in an idle and clogged state to determine the effect of friction on the deposition. In still another example embodiment, a step, instruction, or operation can be implemented for analyzing the current signal to determine the internal diameter of the extrusion nozzle. In yet another example embodiment, a step, instruction, or operation can be provided for analyzing the current signal to determine the distance between the extrusion nozzle and the substrate or previously deposited material.

In another example embodiment, a step, instruction, or operation can be provided for analyzing the current signal to detect the presence or absence of neighboring rasters. In yet another example embodiment, a step, instruction, or operation can be provided for analyzing the current signal to detect nozzle blockage or clogging. In still another example embodiment, a step, instruction, or operation can be provided for analyzing the current signal to detect a surface obstruction.

In another example embodiment, a step, instruction, or operation can be provided for executing process parameter changes in response to diagnostic data resulting in a closed-loop control system. In still another example embodiment, a step, instruction, or operation can be provided for analyzing the current signal to prescribe maintenance decisions.

In another example embodiment, a system for diagnosing and controlling the material deposition during a material extrusion 3D printing process can be implemented. Such a system can include, for example, a current sensor that measures a current signal consumed by a material feed motor, wherein the current signal is analyzed in the time domain to detect material deposition characteristics and prescribe process parameter changes. In some example system embodiments, the extrusion setup can be treated as a second order loaded DC motor system to determine the reaction force that develops within the extrusion nozzle that is caused by the extrudate's interaction with its surroundings.

In another example system embodiment, the current signal can be analyzed in an idle and/or a clogged state to determine the effect of friction on the deposition. In still another example system embodiment, the current signal can be analyzed to determine the internal diameter of the extrusion nozzle. In yet another example system embodiment, the current signal can be analyzed to determine the distance between the extrusion nozzle and the substrate or previously deposited material.

In still other example embodiments, the current signal can be analyzed to detect the presence or absence of neighboring rasters. In other example system embodiments, the current signal can be analyzed to detect nozzle blockage or clogging. In another example system embodiment, the current signal can be analyzed to detect a surface obstruction. In yet another example system embodiment, process parameter changes can be executed in response to diagnostic data to result in a closed-loop control system. In another example system embodiment, the current signal can be analyzed to prescribe maintenance decisions.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION

Figure 1:
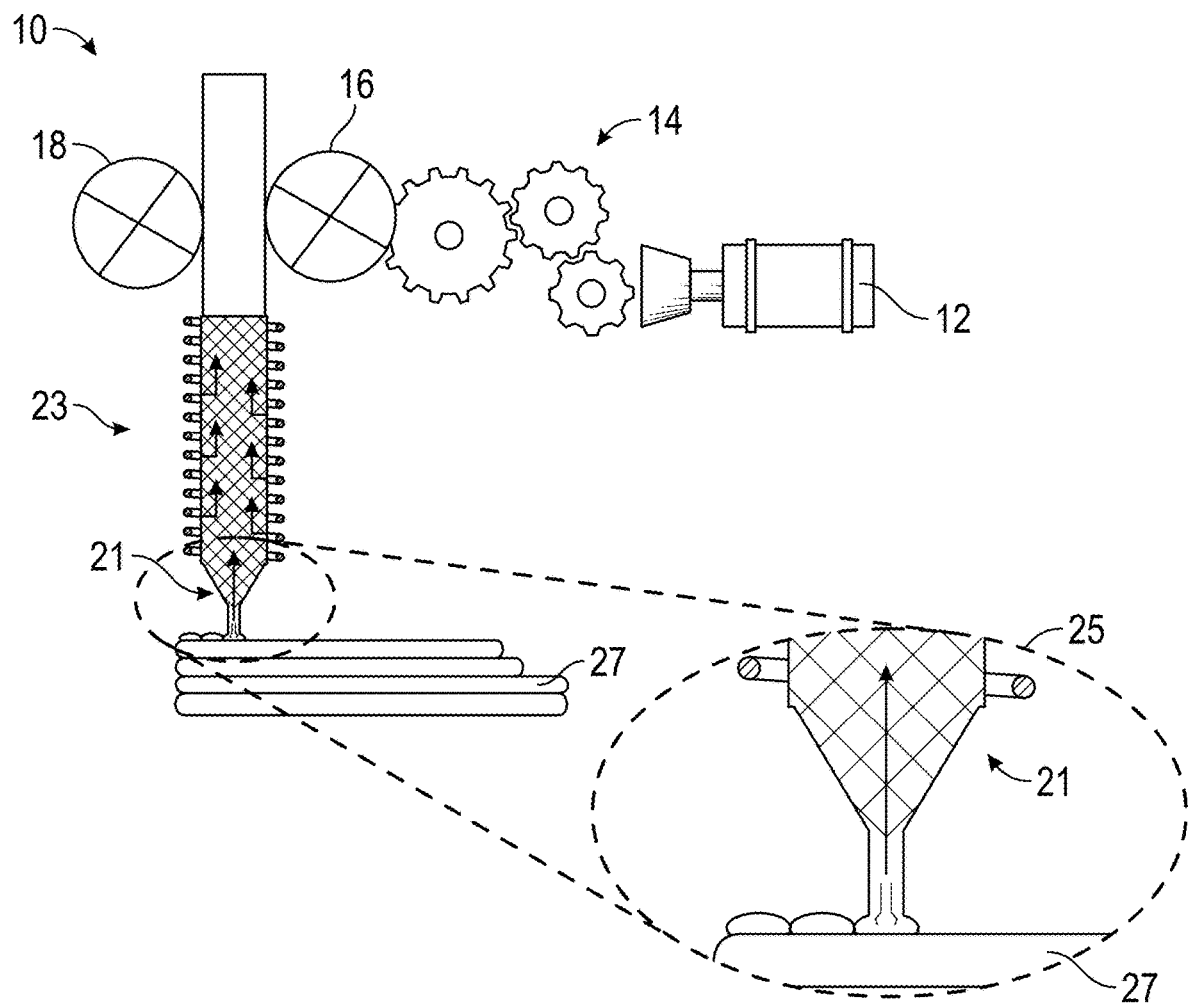
FIG. 1 illustrates a schematic diagram of a single loaded DC motor system that can be utilized to monitor and control a material deposition process, in accordance with an example embodiment.

The particular values and configurations discussed in these non-limiting examples can be varied and are cited merely to illustrate at least one embodiment and are not intended to limit the scope thereof.

The embodiments will now be described more fully hereinafter with reference to the accompanying drawings, in which illustrative embodiments of the invention are shown. The embodiments disclosed herein can be embodied in many different forms and should not be construed as limited to the embodiments set forth herein; rather, these embodiments are provided so that this disclosure will be thorough and complete, and will fully convey the scope of the invention to those skilled in the art. For example, preferred and alternative embodiments are disclosed herein.

Additionally, like numbers refer to identical, like, or similar elements throughout, although such numbers may be referenced in the context of different embodiments. As used herein, the term "and/or" includes any and all combinations of one or more of the associated listed items.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

The disclosed embodiments can be implemented in the context of material extrusion applications such as, for example, 3D printing. As utilized herein, the term "3D printing" also known as AM (Additive Manufacturing) refers to techniques (e.g., methods, processes, related device such as 3D printers, etc.) that can be utilized to create a 3D (three-dimensional) object in which layers of material are formed under the control of a computer (e.g., the data-processing system 200 shown in FIG. 9) to create an object. Objects can be of almost any shape or geometry and can be produced utilizing digital model data from, for example, a 3D model, or another data source as an AMF (Additive Manufacturing File).

At the heart of the disclosed embodiments is the discovery that there exists a relationship between the current consumed by a material feeding motor and the material deposition characteristics (e.g., too much or little material, nozzle clogging, depositing material in air) of a material extrusion 3D printer. In addition, the signal processing of the current driving the material feed motor enables a diagnostic system to detect the deposition status such as thermal deformation, warping, clogged nozzle, obstruction in the deposition path, and lack of substrate material.

In current material extrusion 3D printing technologies, most of these flaws are undetected by the machine. The only method of detecting these failures involves an operator physically monitoring the process to detect such failures. Most often, the operator is not present to stop the fabrication process if a failure occurs. In this case, the continuation of a faulty process results in wasted manufacturing time and material. If the operator is present during a fault, the manufacturing process can be stopped to discontinue the material dispensing, but even in this case there are material and time penalties.

Material extrusion 3D printing machines utilize a DC motor (e.g., material feed motor) to actuate pinch rollers that drive a filament into a heater block, wherein the filament material is introduced into a flowable or liquefied state to facilitate processability and material deposition. Although this disclosure refers to the driving of a filament, the same method can be applied to material extrusion 3D printing processes that use material in pellet, powder, or other resin forms. In the case when pellet or powder materials are used, instead of actuating pinch rollers, the feed motor will drive an extrusion screw (or screws). In any case (filament or other material forms), the disclosed diagnostic and control method can be applied. Note that large extruders can be utilized in combination with robotic systems. The embodiments can be utilized with low volume and large volume extruders.

FIG. 1 illustrates a schematic diagram of a single loaded DC motor system 10 that can be utilized to monitor and control a material deposition process, in accordance with an example embodiment. The DC motor system 10 can include in some example embodiments a material feed motor 12. System 10 can further include one or more gears 14 with respect to the motor 12 and a roller 16. One or more rollers 16, 18 can be included with the system 10 and are shown in the example embodiment of FIG. 1 as being located above a heater block 23. An extrusion nozzle 21 is depicted in FIG. 1 as a part of the system 10. Inset 25 indicates details of the extrusion nozzle 21 and surrounding materials such as, for example, a substrate 27.

The system 10 includes a cold end that pulls and feeds material from a spool and pushes it towards the hot end. The cold end is mostly gear or roller based, supplying torque to the material and controlling the feed rate via the motor 12. Thus, the process rate can be controlled. The hot end is the active part, which can also host a liquefier of a 3D printer that melts the filament. This allows molten plastic to exit from the extrusion nozzle 21 to form a thin and tacky bead of plastic that adheres to the material it is laid on. The hot end can be composed of the heater block 23 and the extrusion nozzle 21. The hole in the tip of extrusion nozzle 21 can have a diameter of between, for example, 0.3 mm and 1.0 mm. As mentioned earlier, there are large extruders currently being used. Diameters of those extruders are in the vicinity of, for example, 10 mm. Note that terms such as FDM, "chamber" and "envelope" refer to the environment surrounding the printed part. The heater block 23, on the other hand, is where the plastic is being melted.

The system 10 can be configured to function as a $2^{nd}$ order single loaded DC motor system. Assuming that the gravity term can be neglected, system 10 can be described from the viewpoint of a pumping motor:

$$J\ddot{\theta}+B\dot{\theta}+R(F_\mu+F_d)+\psi=U_{motor} \quad (1)$$

where J is the inertia term which denotes the mass on the motor [e.g., composed of the mass of the liquefied, flowable, or softened material within the boundary from the roller contact point to the end of extrusion nozzle, and the inertia of a motor and gear box]. Note that the plastic within the heater block is not liquefied, although most people use that term. The material is rather "flowable" or "softened." The "liquefied" as utilized herein thus also includes material that is flowable and softened, but not necessarily "liquid."

The parameter B represents a viscosity term primarily governed by the characteristics of the liquefied material. The parameter R represents the reduction gear ratio. The parameter $F_\mu$ represents the surface friction force occurring along the internal wall of the heated block and inside wall of extrusion nozzle. The parameter $F_d$ represents the reaction force that develops within the extrusion nozzle and is caused by the extrudate's interaction with its surroundings, which can include the environment temperature, the distance between the substrate and extrusion nozzle, and the presence of adjacent material, the presence of nozzle blockage material, the absence of a substrate material onto which to deposit material.

When the material extrusion 3D printing process is utilized to build a part, liquefied material can be pressed out to fill the gap between the extrusion nozzle 21 and the underlying material. Therefore, the parameter $F_d$ represents the reaction force against the extrusion pressure and will be affected by pressure changes near the nozzle exit. The parameter $U_{motor}$ represents the motor input and $\psi$ is the perturbation term, which includes modeling error and higher order terms, but will be bounded.

The single loaded DC motor system 10 depicted in FIG. 1 can be utilized to monitor (or diagnose) and control a material deposition process. However, the relationship between the motor current and the reaction force ($F_d$) must be established. The current consumed by the material feeding motor 12 is mainly influenced by two forces: friction $F_\mu$ and the extruding reaction force $F_d$.

To check the effect of friction force, an experimental test can be performed to compare the motor current values under two conditions: 1) when the motor is driving the filament material to cause extrusion without obstructions (i.e., not clogged and referred to as "idle"), and 2) when the motor 12 is attempting to extrude material through a clogged extrusion tip. Such experiments can be repeated utilizing different sized extrusion tips [e.g., ∅=0.010" (T10), 0.012" (T12), 0.016" (T16)] and at different temperatures of the heater block 23. The results of example experiments are presented in FIG. 2.

Figure 2:
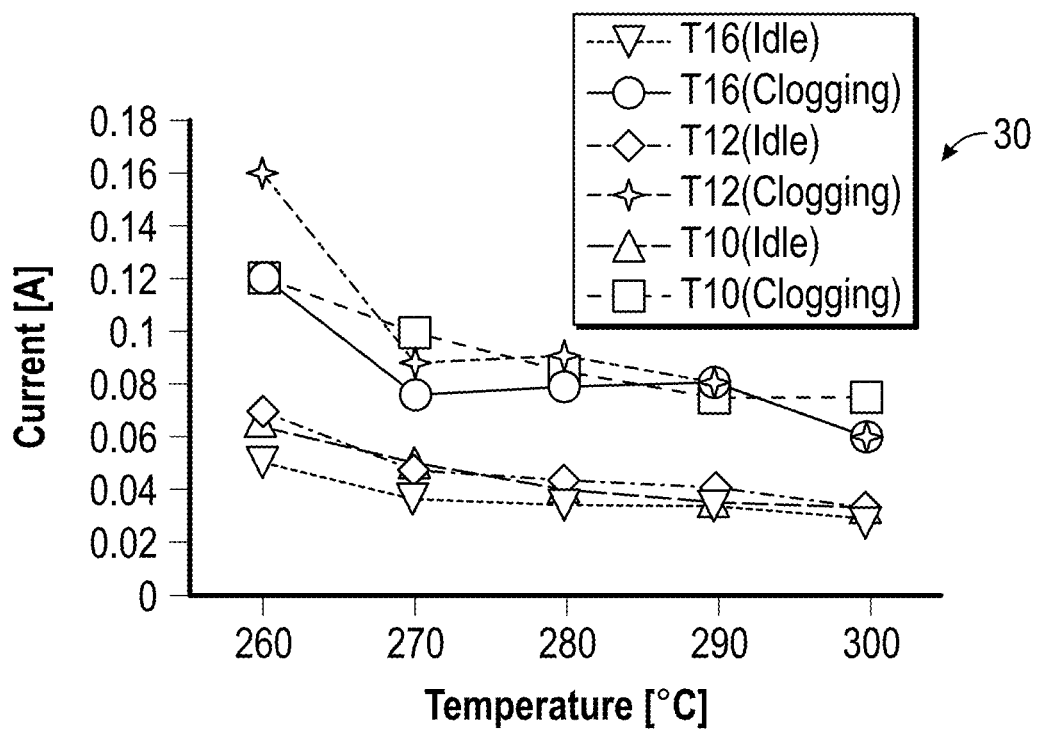
FIG. 2 illustrates a graph depicting data resulting from experiments repeated utilizing different sized extrusion tips and at different heater block temperatures, in accordance with an example embodiment.

FIG. 2 illustrates a graph 30 depicting data resulting from such experiments repeated utilizing different sized extrusion tips and at different heater block temperatures, in accordance with an example embodiment. Graph 30 plots data indicative of current (y-axis) versus temperature (x-axis). The results shown in graph 30 indicate that increasing temperature reduces the viscosity of the liquefied material, which results in decreasing current. For example, when using a T16 extrusion nozzle in an idle condition at 260° C., the motor current was measured at 0.050 A. After the temperature was increased to 300° C., the viscosity of the liquefied material was reduced and the motor current was also reduced to 0.031 A. In addition, the value of current is obviously different between clogged and unclogged. In all cases, there was at least a 93% percent increase in motor current when the nozzle state was changed from unclogged to clogged. The static friction seems not to be affected by the nozzle diameter. In any case, the test demonstrates that the motor current reacted to the change of extrusion force.

Figure 3:
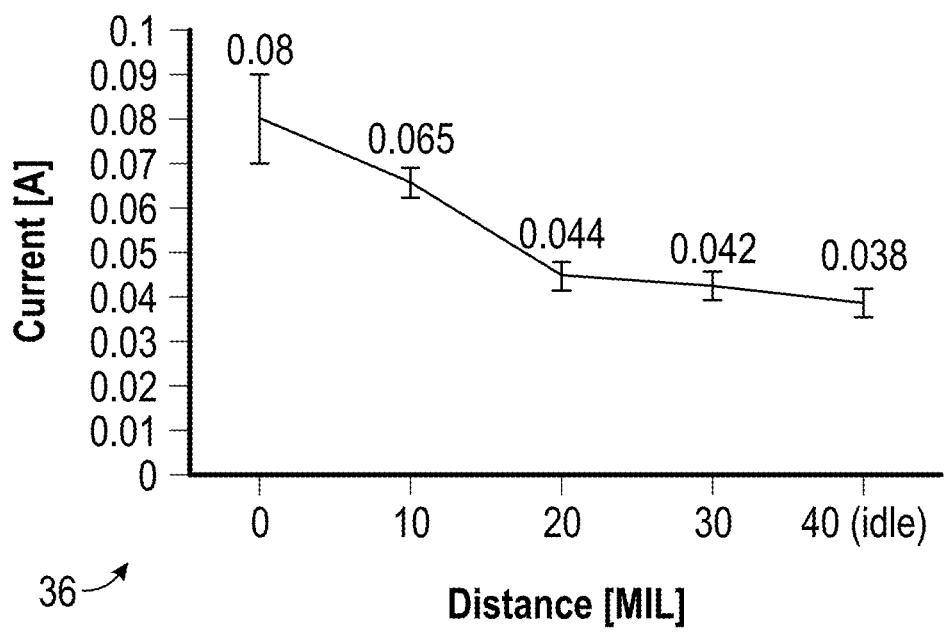
FIG. 3 illustrates a graph depicting data acquired from measuring a current response according to the distance between a nozzle and substrate, in accordance with an example embodiment.

A second test measured the current response according to the distance between the nozzle and substrate. FIG. 3 shows the result. That is, FIG. 3 illustrates a graph 36 depicting data derived from measuring a current response according to the distance between a nozzle and substrate, in accordance with an example embodiment. The distance has the effect on the extrusion force. If building failure occurs, this distance will be changed unexpectedly. One method of amplifying the current response to changes in distance is by increasing the gear ratio of the motor used.

Figure 4:
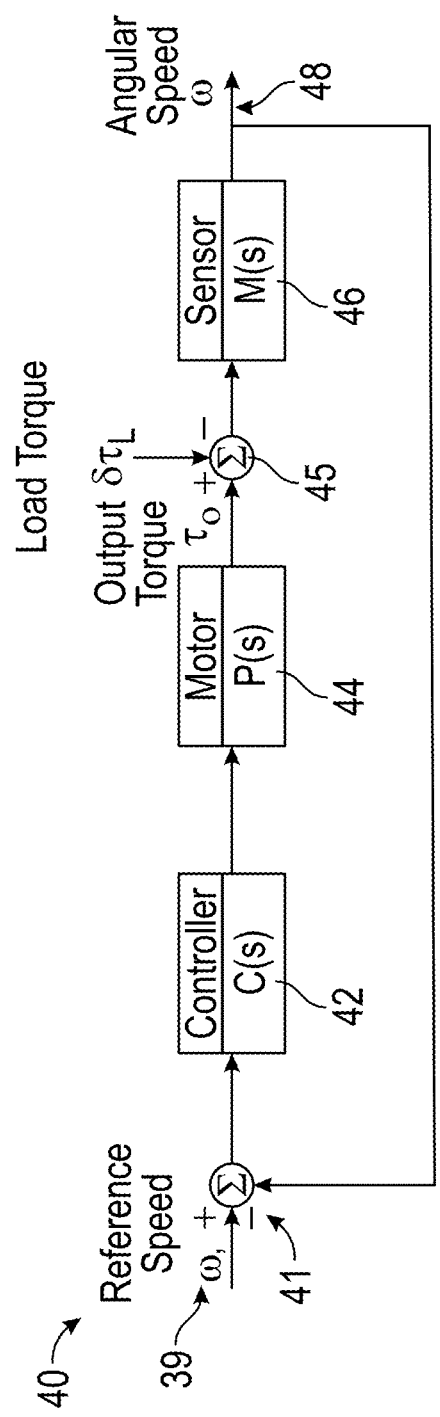
FIG. 4 illustrates a block diagram of a closed-loop speed control system assumed to be linear, in accordance with an example embodiment.

Material extrusion machines, including, for example, FDM machines, FFF machines, and PJP machines may operate utilizing speed control of the material feed motor to maintain the extrusion quantity constant. FIG. 4 illustrates a block diagram of a closed-loop speed control system 40, in accordance with an example embodiment. The closed-loop speed control system 40 shown in FIG. 4 is assumed to be linear and includes a controller 42 (C(s)) whose output is fed to a motor 44 (e.g., analogous to motor 12 of FIG. 1). The output torque from motor 44 together with a load torque are fed to a summation node 45 whose output is provided to a sensor 46. The output from the sensor 46 includes angular speed data 48, which is also fed to a summation node 41 together with a reference speed 39.

Controller C(s) is defined by a control algorithm and the parameter s denotes the Laplace variable. A motor function P(s) can be described as a $1^{st}$ order armature function.

$$P(s) = \frac{K_m}{L_s s + R_s} \quad (2)$$

where $K_m$ is the torque constant and $L_s$ and $R_s$ are the inductance and resistance of the motor, respectively. Sensor M(s) can be described as a 1st order inertia load function because it transforms a torque to angular velocity in spite of using a rotary encoder.

$$M(s) = \frac{1}{J_m s + B_m} \quad (3)$$

From the block diagram of system 40 shown in FIG. 4, the output angular speed 48 is equal to a sum of two functions, which is the function of reference speed $\omega_r$ and disturbances load torque $\delta_{\tau_L}$.

$$\omega(s) = \frac{C(s)P(s)M(s)}{1 + C(s)P(s)M(s)} \omega_r + \frac{-M(s)}{1 - C(s)P(s)M(s)} \delta_{\tau_L} \quad (4)$$

In a steady state, once sufficient time has passed, the variance of angular velocity L, mainly caused by the reaction force against the material being extruded as indicated by equation (5) below:

$$\delta \omega(s) = \frac{-M(s)}{1 - C(s)P(s)M(s)} \delta_{\tau_L} \quad (5)$$

Therefore, the variation of the motor output torque $\delta_{\tau_0}$ is indicated by equation (6) below:

$$\delta_{\tau_o} = \frac{C(s)P(s)M(s)}{1 - C(s)P(s)M(s)} \delta_{\tau_L} \quad (6)$$

Diagnostic data collected either in the time domain or the frequency domain can be used to make maintenance decisions related to changing partially-clogged or fully clogged extrusion nozzles, which removes the responsibility from the user to keep track of the life of the extrusion nozzles. Diagnostic data can also be utilized to make process parameter changes within a closed-loop control system. The process parameter changes can include, but are not limited to, traversing speeds of the extrusion tool, speed of the material feed motor 12 (i.e., motor 44 in FIG. 4), and temperature of the heater blocks such as heater block 23 shown in FIG. 1.

Figure 5:
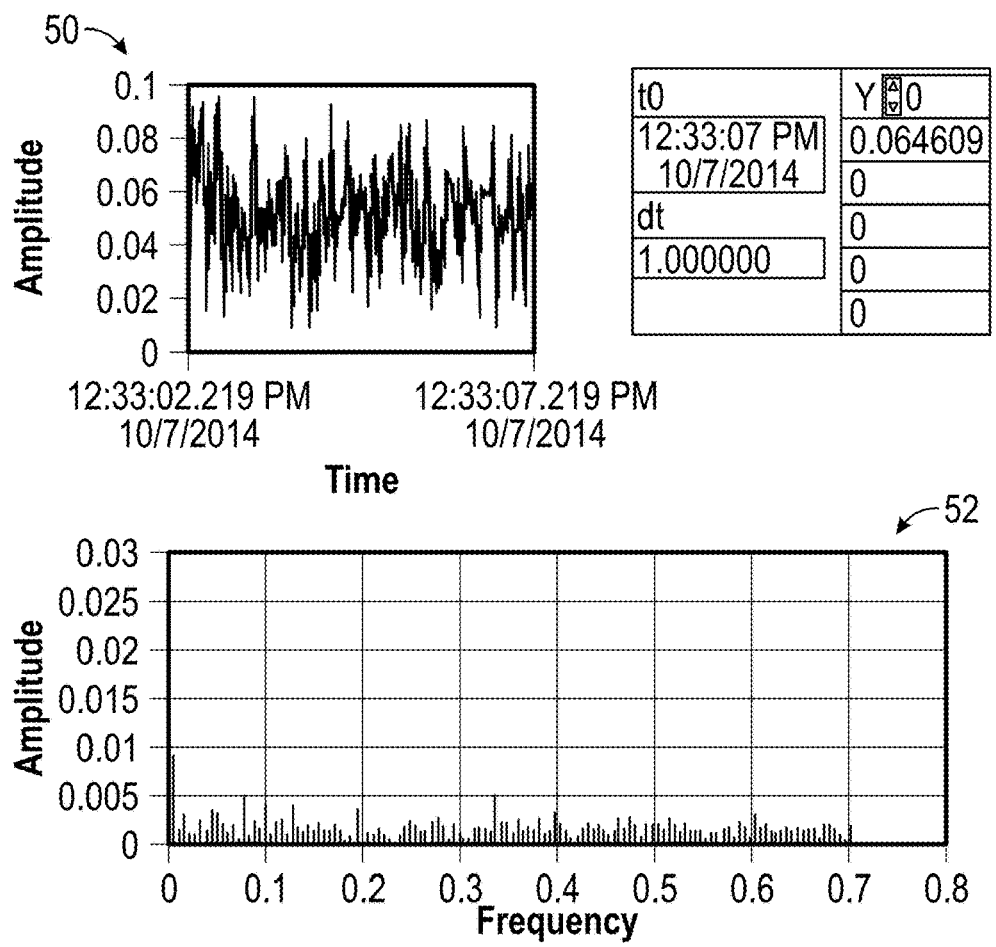
FIG. 5 illustrates graphs and components wherein a second test measured the current variance according to the distance between the nozzle's end and the substrate, in accordance with a disclosed embodiment.

FIG. 5 illustrates graphs 50 and 52 of data resulting from a second test that measured the current variance according to the distance between the end of the nozzle 21 end and the substrate 27, in accordance with a disclosed embodiment. That is, to verify the effect of the extrusion force, a second test measured the current variance according to the distance between the nozzle's end and the substrate.

Although the mean value of current in a steady state increased as the gap from the nozzle to the substrate decreased, the current response to the sudden and short change of extrusion force during building a part is supposed to form an un-uniform oscillating wave shape because this is a high ordered dynamic system. Therefore, it is difficult to detect the build status just by using a threshold approach. Additionally, since commercial FDM machines and similar systems, for example, adopt high gear ratio at the feed motor for stable driving and load tolerance, the actual current consumed by the feeding motor is too small to diagnose the status just by using quantitative measurements of the supplied current. Therefore, the disclosed embodiments involve the analysis of signal variation rather than solely focusing on the value of the signal itself. The signal is analyzed in the frequency domain to detect the change of material deposition during the printing process.

Figure 6:
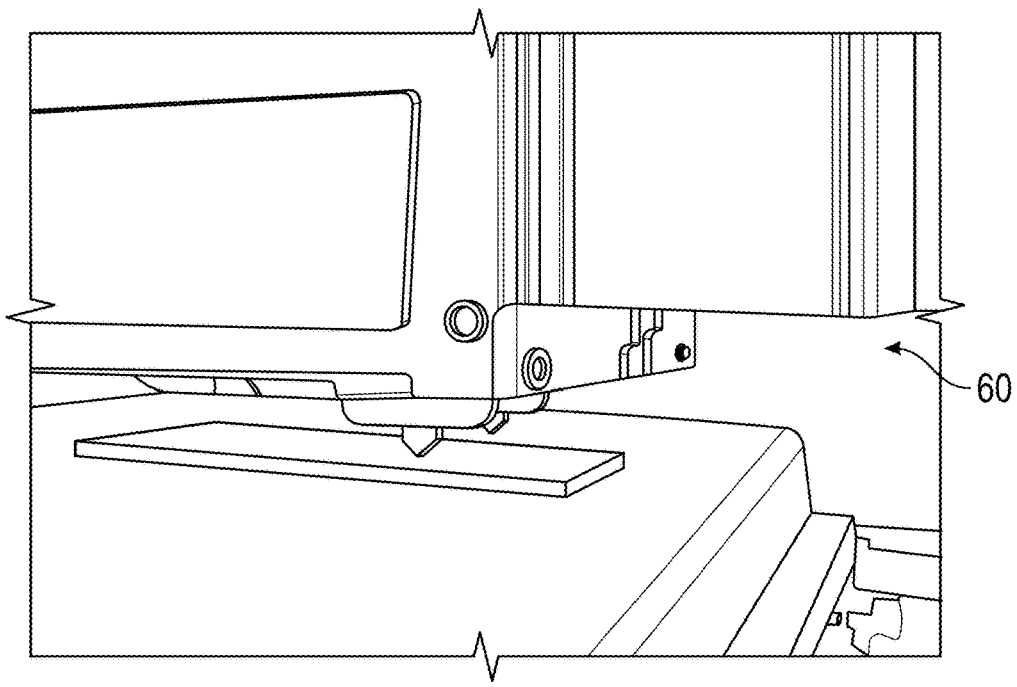
FIG. 6 illustrates a pictorial diagram of a scenario in which a piece of scrap ABS is placed on the surface of a work piece, in accordance with an example embodiment.
Figure 7:
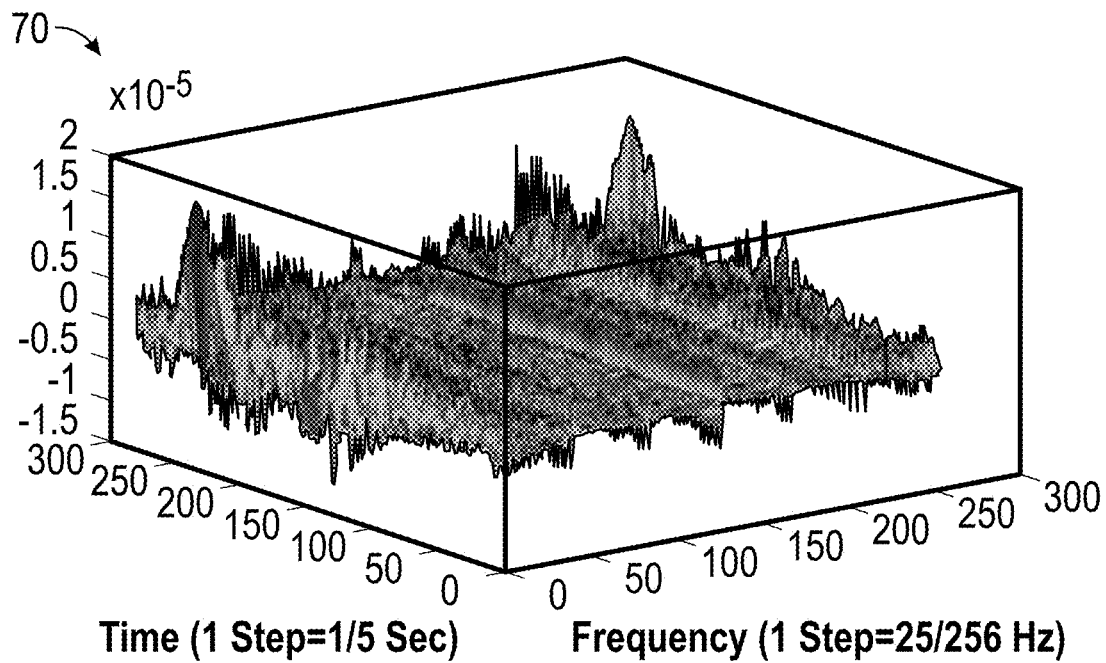
FIG. 7 illustrates a graph depicting sample test results, in accordance with an experimental embodiment.

FIG. 6 illustrates a pictorial diagram 60 of a scenario in which a piece of scrap ABS is placed on the surface of a work piece, in accordance with an example. The result of such a test are shown in graph 70 of FIG. 7. After less than 13 seconds, the nozzle passes over the scrap and the power disparity of each frequency begins to change as indicated in graph 70 by the rectangle and arrow, derived from the test results. The height signifies the amount of power density variation of a specific time and frequency. These test results showed that the current signal is directly related to material extrusion pressure and reflects the change of its status.

Other characteristics that can be determined by analyzing the power spectrum disparities include the internal diameter of the extrusion nozzle, the distance between the extrusion nozzle and the substrate or previously deposited material, the presence or absence of neighboring rasters, the dogging of the nozzle, and the detection of surface obstructions.

Figure 8:
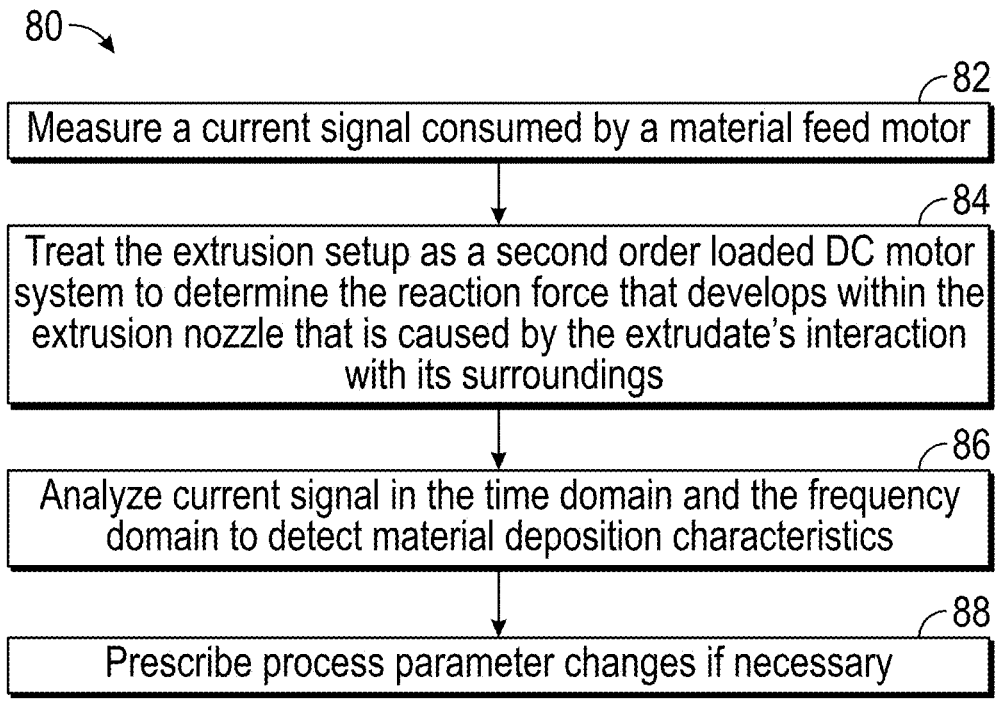
FIG. 8 illustrates a high level flow chart of operations depicting logical operational steps of a method for diagnosing and controlling material deposition during a material extrusion 3D printing process, in accordance with an example embodiment.

FIG. 8 illustrates a high level flow chart of operations depicting logical operational steps of a method 80 for diagnosing and controlling material deposition during a material extrusion 3D printing process, in accordance with an example embodiment. As indicated at block 82, a step or operation can be implemented for measuring with a current signal consumed by a material feed motor. Then, as depicted next at block 84, a step or operation can be provided to treat the extrusion setup as a second order loaded DC motor system to determine the reaction force that develops within the extrusion nozzle that is caused by the extrudate's interaction with its surroundings. Next, as illustrated at block 86, a step or operation can be provided to analyze the current signal in the time domain and the frequency domain to detect material deposition characteristics. Finally, as depicted at block 88, a step or operation can be implemented to prescribe process parameter changes, if necessary.

The current analyzing operation depicted at block 84 can involve, for example, analyzing the current signal in an idle and clogged state to determine the effect of friction on the deposition; analyzing the current signal to determine the internal diameter of the extrusion nozzle; analyzing the current signal to determine the distance between the extrusion nozzle and the substrate or previously deposited material; analyzing the current signal to detect the presence or absence of neighboring rasters; analyzing the current signal to detect nozzle blockage or clogging; analyzing the current signal to detect a surface obstruction; and/or analyzing the current signal to prescribe maintenance decisions.

Benefits of the diagnostic method disclosed here include, but are not limited to, detecting build failures that lead to conserving machine life and avoid the use of consumables on faulty parts. Benefits of controlling the process with the method disclosed herein include, but are not limited to, for example, compensating for building flaws like over- or under-depositing, improvements in surface roughness, improvements in mechanical properties because smaller or less internal porosity can be achieved, and a reduction in build times since there is a higher level of control during the deposition process. Note that process parameter changes can be executed in response to diagnostic data resulting in a closed-loop control system, such as the closed loop system 40 depicted in FIG. 4. The disclosed example embodiments can also be adapted for use with low volume extruders and large volume extruders (e.g., large extruders in combination with robotic systems).

As can be appreciated by one skilled in the art, embodiments may be implemented in the context of a method, data processing system, or computer program product. Accordingly, some example embodiments may take the form of an entire hardware embodiment, an entire software embodiment, or an embodiment combining software and hardware aspects all generally referred to herein as a "circuit" or "module." Furthermore, embodiments may in some cases take the form of a computer program product on a computer-usable storage medium having computer-usable program code embodied in the medium. Any suitable computer readable medium may be utilized including hard disks, USB Flash Drives, DVDs, CD-ROMs, optical storage devices, magnetic storage devices, server storage, databases, etc.

Computer program code for carrying out operations of the present invention may be written in an object oriented programming language (e.g., Java, C++, etc.). The computer program code, however, for carrying out operations of particular embodiments may also be written in conventional procedural programming languages, such as the "C" programming language or in a visually oriented programming environment, such as, for example, Visual Basic.

The program code may execute entirely on the user's computer, partly on the user's computer, as a stand-alone software package, partly on the user's computer and partly on a remote computer, or entirely on the remote computer. In the latter scenario, the remote computer may be connected to a user's computer through a local area network (LAN) or a wide area network (WAN), wireless data network e.g., Wi-Fi, Wimax, 802.xx, and cellular network or the connection may be made to an external computer via most third party supported networks (for example, through the Internet utilizing an Internet Service Provider).

The embodiments are described at least in part herein with reference to flowchart illustrations and/or block diagrams of methods, systems, and computer program products and data structures according to embodiments of the invention. It will be understood that each block of the illustrations, and combinations of blocks, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act (e.g., instructions, operations, steps) specified in the block or blocks such as, for example, blocks 82, 84, 86, and 88 depicted in FIG. 8.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the block or blocks.

Figure 9:
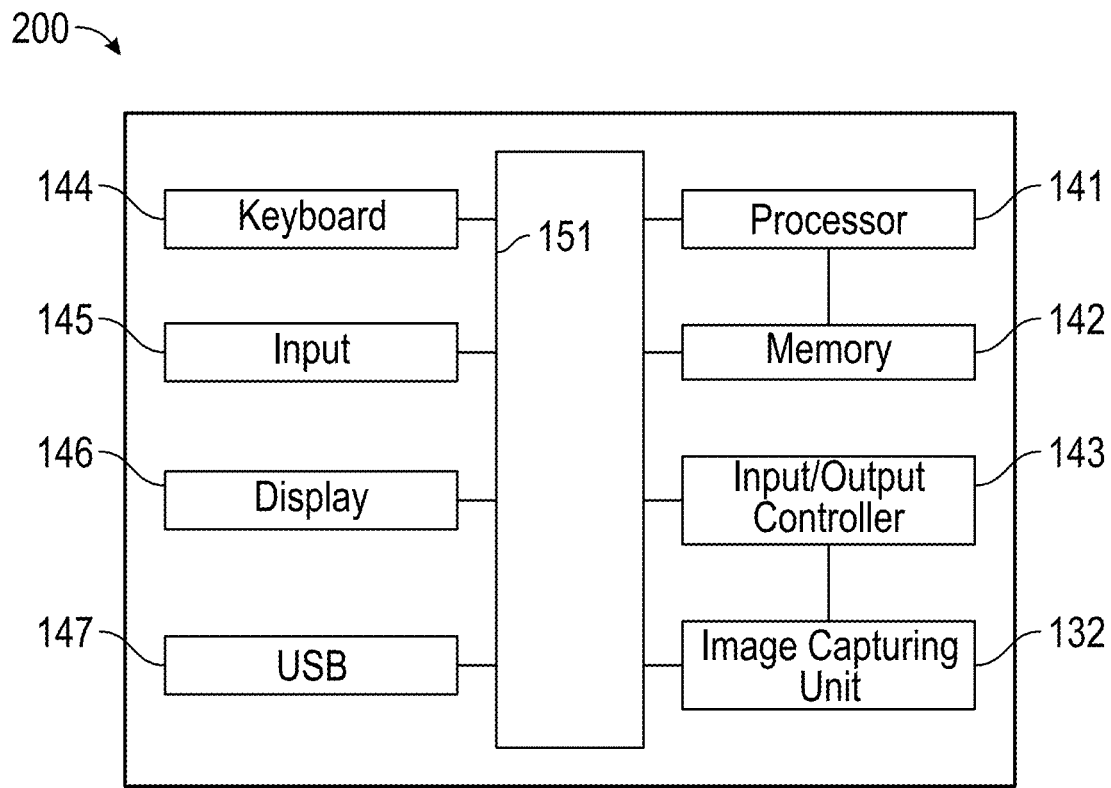
FIG. 9 illustrates a schematic view of a computer system, in accordance with an embodiment.
Figure 10:
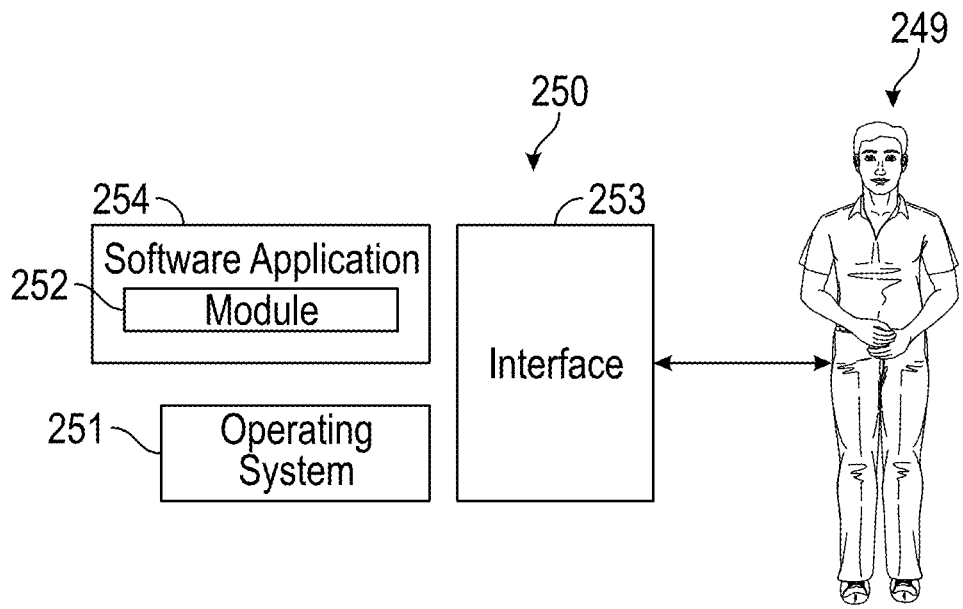
FIG. 10 illustrates a schematic view of a software system including a module, an operating system, and a user interface, in accordance with an embodiment.

FIGS. 9-10 are provided as exemplary diagrams of data-processing environments in which embodiments of the present invention may be implemented. It should be appreciated that FIGS. 9-10 are only exemplary and are not intended to assert or imply any limitation with regard to the environments in which aspects or embodiments of the disclosed embodiments may be implemented. Many modifications to the depicted environments may be made without departing from the spirit and scope of the disclosed embodiments.

As illustrated in FIG. 9, some embodiments may be implemented in the context of a data-processing system 200 that includes, for example, a processor 141, a memory 142, an input/output controller 143, an image capturing unit or camera(s) 132, a keyboard 144, an input device 145 (e.g., a pointing device, such as a mouse, track ball, and pen device, etc.), a display 146, and a USB (Universal Serial Bus) peripheral connection 147. As illustrated, the various components of data-processing system 200 can communicate electronically through a system bus 151 or similar architecture. The system bus 151 may be, for example, a subsystem that transfers data between, for example, computer components within data-processing system 200 or to and from other data-processing devices, components, computers, etc. In some example embodiments, data-processing system 200 may include an image-capturing unit 132 (e.g., a camera associated with a smartphone or tablet computing device).

FIG. 10 illustrates a computer software system 250 for directing the operation of the data-processing system 200 depicted in FIG. 9. Software application 254 stored, for example, in memory 142 generally includes a kernel or operating system 251 and a shell or interface 253. One or more application programs, such as software application 254, may be "loaded" (i.e., transferred from, for example, a mass storage or other memory location into the memory 142) for execution by the data-processing system 200. The data-processing system 200 can receive user commands and data through an interface 253; these inputs may then be acted upon by the data-processing system 200 in accordance with instructions from operating system 251 and/or software application 254. The interface 253 in some embodiments can serve to display results, whereupon a user 249 may supply additional inputs or terminate a session. The software application 254 can include a module 252 that may store and/or process instructions such as, for example, the instructions described herein with respect to blocks 82, 84, 86, 88 of method 80 shown in FIG. 8. Module 252 may also include instructions for implementing, for example, the control system 40 shown in FIG. 4.

The following discussion is intended to provide a brief, general description of suitable computing environments in which the system and method may be implemented. Although not required, the disclosed embodiments will be described in the general context of computer-executable instructions, such as program modules, being executed by a single computer. In most instances, a "module" constitutes a software application.

Generally, program modules include, but are not limited to, routines, subroutines, software applications, programs, objects, components, data structures, etc., that perform particular tasks or implement particular abstract data types and instructions. Moreover, those skilled in the art will appreciate that the disclosed method and system may be practiced with other computer system configurations, such as, for example, hand-held devices, multi-processor systems, data networks, microprocessor-based or programmable consumer electronics, networked PCs, minicomputers, mainframe computers, servers, and the like.

Note that the term module as utilized herein may refer to a collection of routines and data structures that perform a particular task or implements a particular abstract data type. Modules may be composed of two parts: an interface, which lists the constants, data types, variable, and routines that can be accessed by other modules or routines; and an implementation, which is typically private (accessible only to that module) and which includes source code that actually implements the routines in the module. The term module may also simply refer to an application, such as a computer program designed to assist in the performance of a specific task, such as word processing, accounting, inventory management, etc. The module 252 shown in FIG. 10 can thus implement instructions such as those shown and described and illustrated herein with respect to FIGS. 1-8 herein.

FIGS. 9-10 are intended as examples and not as architectural limitations of disclosed embodiments. Additionally, such embodiments are not limited to any particular application or computing or data processing environment. Instead, those skilled in the art will appreciate that the disclosed approach may be advantageously applied to a variety of systems and application software. Moreover, the disclosed embodiments can be embodied on a variety of different computing platforms, including Macintosh, UNIX, LINUX, and the like.

Based on the foregoing, it can be appreciated that a number of example embodiments are disclosed herein. For example, in one embodiment, a method for diagnosing and controlling material deposition during a material extrusion 3D printing process can be implemented. Such a method can include steps, instruction, or operations such as measuring with a current sensor a current signal consumed by a material feed motor, wherein the current signal is analyzed in the frequency domain and the time domain to detect material deposition characteristics and prescribe process parameter changes. In some example embodiments, other steps, instructions, or operations can be implemented, such as, for example, treating the extrusion setup as a second order loaded DC motor system to determine the reaction force that develops within the extrusion nozzle that is caused by the extrudate's interaction with its surroundings.

In other example embodiments, a step, instruction, or operation can be implemented for analyzing the current signal in an idle and clogged state to determine the effect of friction on the deposition. In still another example embodiment, a step, instruction, or operation can be implemented for analyzing the current signal to determine the internal diameter of the extrusion nozzle. In yet another example embodiment, a step, instruction, or operation can be provided for analyzing the current signal to determine the distance between the extrusion nozzle and the substrate or previously deposited material.

In another example embodiment, a step, instruction, or operation can be provided for analyzing the current signal to detect the presence or absence of neighboring rasters. In yet another example embodiment, a step, instruction, or operation can be provided for analyzing the current signal to detect nozzle blockage or clogging. In still another example embodiment, a step, instruction, or operation can be provided for analyzing the current signal to detect a surface obstruction.

In another example embodiment, a step, instruction, or operation can be provided for executing process parameter changes in response to diagnostic data resulting in a closed-loop control system. In another example embodiment, a step, instruction, or operation can be provided for analyzing the current signal to prescribe maintenance decisions.

In another example embodiment, a system for diagnosing and controlling the material deposition during a material extrusion 3D printing process can be implemented. Such a system can include, for example, a current sensor that measures a current signal consumed by a material feed motor, wherein the current signal is analyzed in the time domain to detect material deposition characteristics and prescribe process parameter changes. In some example system embodiments, the extrusion setup can be treated as a second order loaded DC motor system to determine the reaction force that develops within the extrusion nozzle that is caused by the extrudate's interaction with its surroundings.

In another example system embodiment, the current signal can be analyzed in an idle and/or a clogged state to determine the effect of friction on the deposition. In still another example system embodiment, the current signal can be analyzed to determine the internal diameter of the extrusion nozzle. In yet another example system embodiment, the current signal can be analyzed to determine the distance between the extrusion nozzle and the substrate or previously deposited material.

In still other example embodiments, the current signal can be analyzed to detect the presence or absence of neighboring rasters. In other example system embodiments, the current signal can be analyzed to detect nozzle blockage or clogging. In another example system embodiment, the current signal can be analyzed to detect a surface obstruction. In yet another example system embodiment process parameter changes can be executed in response to diagnostic data to result in a closed-loop control system. In another example system embodiment the current signal can be analyzed to prescribe maintenance decisions.

It will be appreciated that variations of the above-disclosed and other features and functions, or alternatives thereof, may be desirably combined into many other different systems or applications. It will also be appreciated various presently unforeseen or unanticipated alternatives, modifications, variations or improvements therein may be subsequently made by those skilled in the art, which are also intended to be encompassed by the following claims.

What is claimed is:

1. A method for diagnosing and controlling material deposition during a material extrusion 3D printing process, the method comprising:

measuring with a current sensor a current signal consumed by a material feed motor;
analyzing the current signal in the frequency domain and the time domain to detect material deposition characteristics;
analyzing the current signal to detect any nozzle blockage or clogging; and
prescribing process parameter changes, if necessary.

2. The method of claim 1 further comprising treating the extrusion setup as a second order loaded DC motor system to determine the reaction force that develops within the extrusion nozzle that is caused by the extrudate's interaction with its surroundings.

3. The method of claim 1 further comprising analyzing the current signal in an idle and clogged state to determine the effect of friction on the deposition.

4. The method of claim 1 further comprising analyzing the current signal to determine the internal diameter of the extrusion nozzle.

5. The method of claim 1 further comprising analyzing the current signal to determine the distance between the extrusion nozzle and the substrate or previously deposited material.

6. The method of claim 1 further comprising analyzing the current signal to detect the presence or absence of neighboring rasters.

7. The method of claim 1 further comprising analyzing the current signal to detect a surface obstruction.

8. The method of claim 1 further comprising executing process parameter changes in response to diagnostic data resulting in a closed-loop control system.

9. The method of claim 1 further comprising analyzing the current signal to prescribe maintenance decision.

10. A system for diagnosing and controlling the material deposition during a material extrusion 3D printing process, the system comprising:
   a current sensor configured to:
      measure a current signal consumed by a material feed motor;
      analyze the current signal in the time domain to detect material deposition characteristics;
      analyze the current signal to detect any nozzle blockage or clogging; and
      prescribe process parameter changes, if necessary.

11. The system of claim 10 wherein an extrusion setup is treated as a second order loaded DC motor system to determine the reaction force that develops within the extrusion nozzle that is caused by the extrudate's interaction with its surroundings.

12. The system of claim 10 wherein the current signal is analyzed in an idle and clogged state to determine the effect of friction on the deposition.

13. The system of claim 10 wherein the current signal is analyzed to determine the internal diameter of the extrusion nozzle.

14. The system of claim 10 wherein the current signal is analyzed to determine the distance between the extrusion nozzle and the substrate or previously deposited material.

15. The system of claim 10 wherein the current signal is analyzed to detect the presence or absence of neighboring rasters.

16. The system of claim 10 wherein the current signal is analyzed to detect a surface obstruction.

17. The system of claim 10 wherein process parameter changes are executed in response to diagnostic data to result in a closed-loop control system.

18. A system for diagnosing and controlling the material deposition during a material extrusion 3D printing process, the system comprising:
   a current sensor configured to:
      measure a current signal consumed by a material feed motor;
      analyze the current signal is analyzed in a frequency domain to detect material deposition characteristics;
      analyze the current signal to detect any nozzle blockage or clogging; and
      prescribe process parameter changes, if necessary.

19. The method of claim 1, further comprising prescribing process parameter changes, if necessary.

20. The system of claim 10, wherein the current sensor if further configured to prescribe process parameter changes, if necessary.

* * * * *